United States Patent [19]

Wible

[11] Patent Number: 4,635,439

[45] Date of Patent: Jan. 13, 1987

[54] FLUID OPERATED SYSTEM CONTROL

[75] Inventor: John E. Wible, Painesville, Ohio

[73] Assignee: Caterpillar Industrial Inc., Mentor, Ohio

[21] Appl. No.: 722,236

[22] Filed: Apr. 11, 1985

[51] Int. Cl.$^4$ ............................................. B62D 5/07
[52] U.S. Cl. ...................................... 60/420; 60/421; 60/422; 60/426; 60/486; 60/911
[58] Field of Search .................. 60/420, 911, 421, 422, 60/423, 426, 486; 91/513, 514, 516, 532

[56] References Cited

U.S. PATENT DOCUMENTS

| | | | |
|---|---|---|---|
| 3,443,380 | 5/1969 | Karazija | 60/421 |
| 3,760,591 | 9/1973 | Gordon | 60/911 |
| 3,875,747 | 4/1975 | Briggs | 60/420 |
| 4,043,419 | 8/1977 | Larson et al. | 180/132 |
| 4,044,786 | 8/1977 | Yip | 60/422 |
| 4,070,857 | 1/1978 | Wible | 60/422 |
| 4,102,132 | 7/1978 | Palmer | 60/433 |
| 4,449,365 | 5/1984 | Hancock | 60/422 |
| 4,505,111 | 3/1985 | Okamoto et al. | 60/911 |

Primary Examiner—Robert E. Garrett
Assistant Examiner—John M. Husar
Attorney, Agent, or Firm—Alan J. Hickman

[57] ABSTRACT

A control having a primary work system, a secondary work system, a first fluid flow generating system, and a second fluid flow generating system is provided. A control signal delivering device is provided to deliver a control signal having a magnitude responsive to a relative location of a control valve between a first and second position of a control valve. A control signal receiving device receives the control signal and separately controls the flow rate deliverable from the first and second flow generating system in response to the magnitude of the control signal received. The control signal receiving device has a set point value which is representative of a preselected magnitude of the received control signal. The second fluid flow generating system is controlled to deliver fluid only in response to the magnitude of the received control signal having a value greater than preselected deliverable flow rate. The first flow generating system is controlled to deliver fluid at a rate responsive to the magnitude of the received control signal and, during periods at which the received control signal has a value greater than the set point, reduces the fluid flow deliverability rate of the first flow generating system, an amount substantially equal to the flow rate being delivered by the second flow generating system.

11 Claims, 3 Drawing Figures

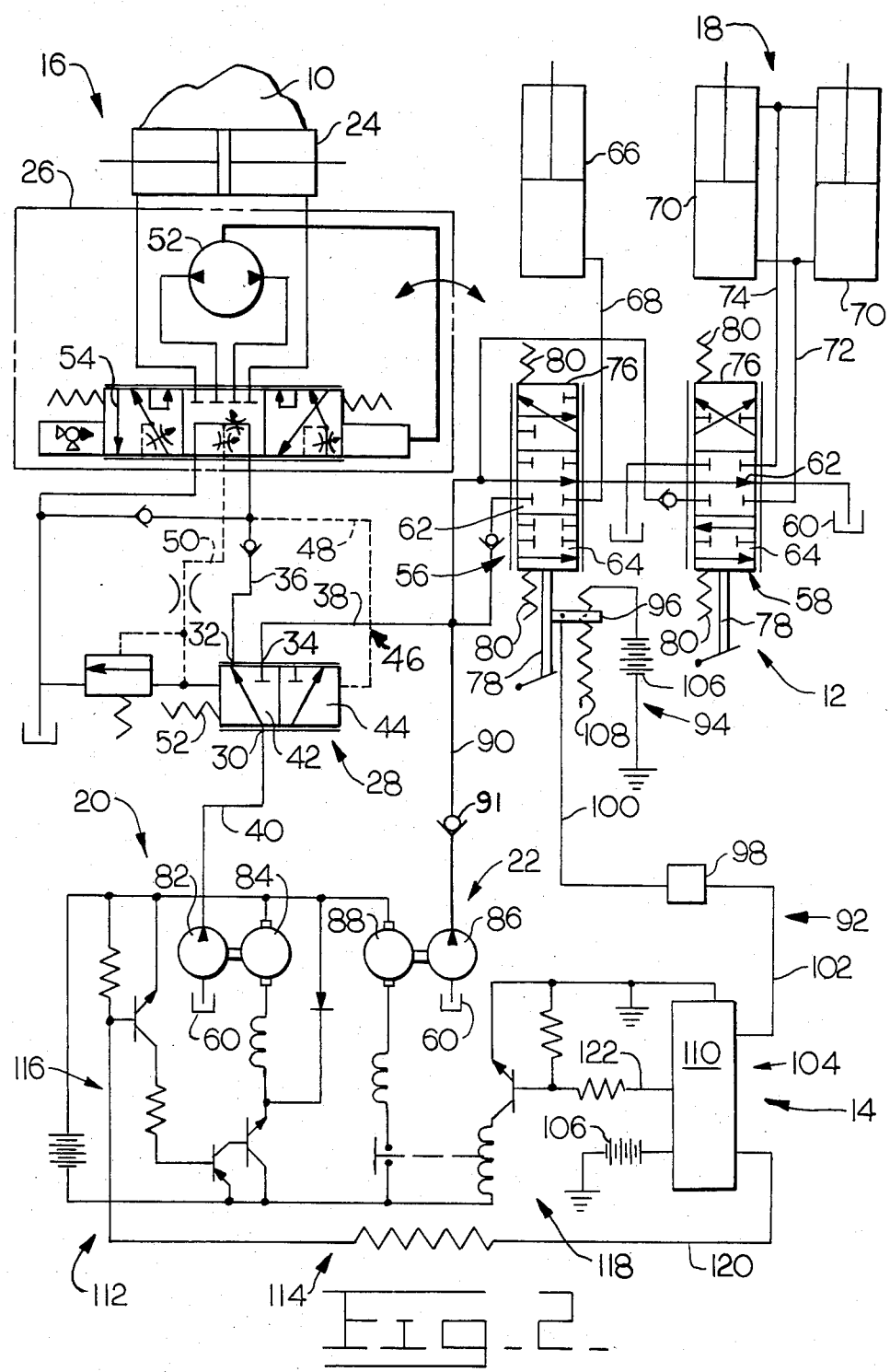
FIG_2

FLUID OPERATED SYSTEM CONTROL

DESCRIPTION

1. Technical Field

This invention relates to a control for a fluid operated system and more particularly to a control for regulating the flow of fluid deliverable by first and second flow generating systems in response to the position of a fluid directing control valve.

2. Background Art

Fluid operated systems are known where a single pump of constant output is sized to match the maximum flow rate of the fluid requirements of the system. Such a system is shown in U.S. Pat. No. 4,043,419 to Bernard J. Larson et al., dated Aug. 23, 1977. Because a small percentage of the fluid flow generated by the pump is utilized for work, a substantial amount of horsepower and energy is wasted. Replacement of the constant volume pump with a variable displacement pump improves operation of the system and substantially increases its efficiency. However, costs of such a system and in particular for use in cost conscience machines, for example, lift trucks, is prohibitive.

Solutions to the problems of cost and efficiency have been attempted. An example of one such attempt is discussed in U.S. Pat. No. 3,875,747 to Kenneth Edward Briggs dated Apr. 8, 1975. In this system, a single hydraulic pump is driven by an electric motor. A control unit is provided to change the speed of the motor in response to actuation of a first or second control valve according to preselected stepped increments of flow. Although the system is more economical than a variable displacement pump designed system, the size of the pump must be made large enough to handle the maximum flow rate of the system and therefore is inefficient at low speeds where the flow is at a minimum. Since the control unit only senses an on or off condition of the control valves, the speed of the driving motor is therefor changeable only in steps. As a result, the system is inefficient because the flow provided is frequently greater than the flow required. Also, operation of such a system is jerky at the speed changes making controllability of operation difficult.

Lift and steering control units for lift trucks wherein two pumps and two electric motors driving each of the pumps respectively are known. Such a system is taught in U.S. Pat. No. 4,449,365 to Peter D. Hancock dated May 22, 1984. In this system, the speed of each motor is established at a fixed rate and either turned on or turned off depending upon the conditions of a plurality of switches. For reasons similar to those mentioned above, the fluid flow supplied to the lift, tilt, and steering systems will not be at the flow required but at a selected level of flow above the demand. Thus, the efficiency of the system is substantially lower than desired. Thus, a need exists for a control which is capable of economically, efficiently, and smoothly delivering the proper amount of fluid flow to each of the work systems.

The present invention is directed to overcoming one or more of the problems as set forth above.

DISCLOSURE OF THE INVENTION

In one aspect of the present invention, a control for a fluid operated system is provided. The fluid operated system has a primary work system, a secondary work system, a first fluid flow generating system, a second fluid flow generating system, and a control valve which is movable between first and second positions. The control valve is connected to the work systems and the fluid flow generating systems. A control signal delivering device delivers a control signal having a magnitude responsive to the relative location of the control valve between first and second positions, and a control signal receiving device receives the control signal and separately controls the flow rate deliverable from the first and second fluid flow generating systems in response to the magnitude of the control signal received. The control signal receiving device has a set point value representative of a preselected magnitude of the received control signal. The second fluid flow generating system is controlled to deliver fluid only in response to the magnitude of the received control signal having a value greater than the set point and at a substantially constant preselected deliverable flow rate and the first flow generating system is controlled to deliver fluid at a rate responsive to the magnitude of the received control signal. During period at which the received control signal is at a value greater than the set point, the fluid flow deliverability rate of the first flow generating system is reduced an amount substantially equal to the flow rate delivered by the second flow generating system.

In another aspect of the present invention, a work vehicle has a vehicle frame, a work implement mounted on said frame, a steering system, and an implement system. The steering system has a fluid operated steering motor and a steering control valve connected to the steering motor, and the implement system has a fluid operated implement motor and an implement control valve connected to the implement motor. A flow control valve is connected to the steering control valve and the implement control valve. A first electric motor is drivingly connected to a first pump and adapted to deliver fluid flow at a rate proportional to the speed of the first electric motor, and a second electric motor is drivingly connected to a second pump and adapted to deliver fluid flow to said implement control valve at a rate proportional to the speed of the second electric motor. The flow control valve is adapted to pass fluid flow delivered from the first pump to the steering control valve and the implement control valve on a steering flow priority demand basis. The control signal delivering device is responsive to movement of the implement control valve to deliver a control signal having a magnitude representative of the location of the implement control valve, and a control signal receiving device is responsive to the delivered control signal to simultaneously decrease the speed of the first motor and actuate the second motor in response to the control signal being at a preselected magnitude.

Thus, the control improves the efficiency of the fluid operated system by providing first and second flow generating systems and by replacing a portion of the fluid flow delivered by the first fluid flow generating system with an equal amount of fluid flow by the second fluid flow generating system. Also, the efficiency is further increased by providing control signal delivering and receiving devices which are responsive to the location of the control valve to vary the rate of fluid flow deliverable by the first fluid flow generating system. Because the second fluid flow generating system is only capable of delivering fluid flow at a single flow rate, the cost of the control is substantially reduced and is especially useful in vehicles such as electrically driven lift trucks.

BRIEF DESCRIPTION OF THE DRAWINGS

FIG. 2 is a diagrammatic schematic drawing depicting an embodiment of the present invention of FIG. 1 showing a fluid operated system having a primary work system, a secondary work system, first and second fluid flow generating systems, and a control having control signal delivering and receiving devices.

BEST MODE FOR CARRYING OUT THE INVENTION

Figure 1:
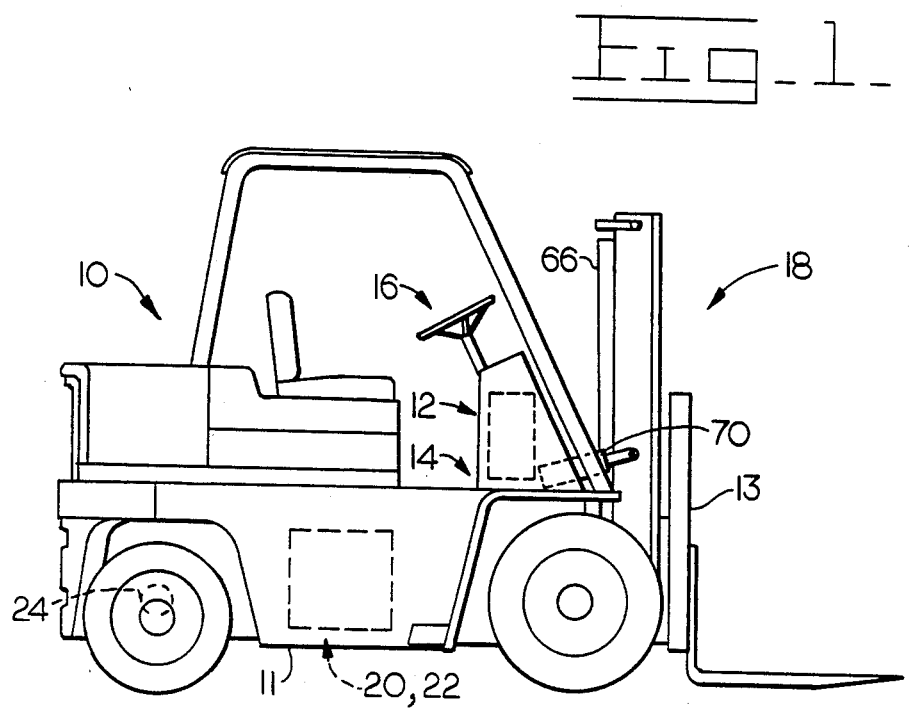
FIG. 1 is a diagrammatic side elevational view of an embodiment of the present invention showing a work vehicle having a work implement, primary and secondary fluid operated systems, and a control for the fluid operated system.

With reference to the drawings and particularly FIG. 1, a work vehicle 10, for example a lift truck, has a frame 11, a work implement 13 mounted on the frame 11, fluid operated system 12 and control 14. The fluid operated system 12 includes a primary work system 16, a secondary work system 18, and first and second fluid flow generating systems 20 and 22. As best seen in FIG. 2, the primary work system 16 preferably includes a steering motor 24 of a linear variety, a steering valve 26, and a pilot operated flow control valve 28.

The flow control valve 28 has an inlet port 30 and first and second outlet ports 32 and 34. The first outlet port 32 is connected to the steering valve 26 via conduit 36, and the second outlet port 34 is connected to the secondary work system 18 via conduit 38. The inlet port 30 is connected to the first fluid flow generating system 20 by conduit 40 and is adapted to pass fluid flow from the first fluid flow generating system 20 to the inlet 30 of the flow control valve 28. The flow control valve 28 is movable between a first position 42 at which the inlet port 30 is connected to the outlet port 32 and blocked from the outlet port 34, and a second position 44 at which the inlet port 30 is substantially blocked from outlet port 32 and connected to outlet port 34. The flow control valve 28 is infinitely variable between the first and second positions so that the amount of fluid flow deliverable from the inlet 30 to the outlets 32 and 34 is a function of position of the flow control valve 28 between the first and second positions 42 and 44.

Means 46 is provided for moving the flow control valve 28 from the first position 42 toward the second position 44 in response to the rate of fluid delivered from the first fluid flow generating system 20 to the steering motor 24 being greater in magnitude than the amount of fluid required by the steering valve 26. Means 46 preferably includes first and second pilot signal lines 48 and 50 which are connected to the flow control valve at opposite ends thereof and to the steering valve 26. The pilot line 48 delivers a pressurized fluid signal from the inlet of the control valve (line 36) to urge the flow control valve from the first position 42 towards the second position 44. Conversely, the second pilot line 50 delivers a metered flow of fluid from the steering control valve to the other end of the flow control valve 28 and urges the flow control valve to the first position 42. A spring 52 maintains the flow control valve 28 in the first position 42 in the absence of an adequate amount of fluid pressure differential at the end of the flow control valve 28 and insures that a preselected minimum amount of fluid flow is delivered to the steering control valve 26.

The steering control valve 26 is preferably a load sensing steering control unit having a hand metering unit 52 which generates fluid pressure to position the steering valve control spool 54 and vary the amount of fluid flow deliverable to the steering motor 24.

The secondary work system 18 includes first and second implement control valves 56 and 58 of preferably the open center type connected to one another and to the second outlet port 34 of the flow control valve 28 via conduit 38. Fluid flow passed by conduit 38 to either of the control valves 56 and 58 is directed to tank 60 unless interrupted by shifting of either of the implement control valves 56,58. A first fluid operated implement motor 66 which is preferably a single acting fluid operated lift jack is connected to the first implement control valve via conduit 68. A second pair of fluid operated implement motors 70, which preferably are double acting fluid operated jacks, are connected at their head ends to the second implement control valve 58 via conduit 72 and at their rod ends to the second implement control valve 58 via conduit 74.

Each of the implement control valves 56 and 58 are infinitely variable and movable between the first and second positions as well as between a first and third position 76. At the first position 62 of both implement control valves 56 and 58, fluid flow is directed by the implement control valves from conduit 38 to tank 60. The first control valve 56 directs fluid flow from conduit 38 to motor 66 at its second position and directs fluid flow from motor 66 to reservoir 60 when in the third position 76. Similarly, second implement control valve 58 directs fluid flow from conduit 38 to the head end of the motor 70 and from the rod end of the motor 70 to the reservoir 60 when at the second position 64, and directs fluid flow from conduit 38 to the rod end of the motor 70 and from the head end of the motor 70 to tank 60 when at the third position 76. Movement of the implement control valves 56,58 between the first, second, and third positions 62,64,76 is accomplished by shift levers 78. Each of the implement control valves 56 and 58 are biased to their respective first positions 62 via centering springs 80 in a conventional manner.

The first fluid flow generating system 20 includes a first fixed displacement pump 82 and a first variable speed motor 84 drivingly connected to the first pump 82. Preferably, the first fixed displacement pump is either of the gear or piston type, and the first motor 84 is a variable speed electric motor. The first pump 82 is connected to reservoir 60 and directs fluid flow therefrom to flow control valve 28 via conduit 40.

The second fluid flow generating system 22 includes a second fixed displacement pump 86 and a second motor 88 drivingly connected to the second pump 86. The second pump 86 is either a gear, impeller, or a fixed displacement piston pump, and the second motor is preferably a single speed electric motor. The second fixed displacement pump 86 is connected to conduit 38 via fourth conduit 90 and directs fluid flow from reservoir 60 to conduit 38 via conduit 90. A check valve 91 is provided in conduit 90 to prevent fluid from passing from conduit 38 to pump 86. It is to be noted that the first motor 84 is variable in speed and the second motor 88 is a single or fixed speed motor. The first fixed displacement pump 82 preferably has a preselected maximum flow capacity which is substantially greater in magnitude than a preselected maximum flow capacity of the second fixed displacement pump 86. The relative size of each of the two pumps is based on the total flow requirements of the system and the efficiency of the pumps at various motor speeds. It has been demonstrated that large pumps having a maximum flow capacity of, for example, 16 g.p.m. are noisy and inefficient at a low speed. In contrast, smaller pumps, for example, one having a maximum of flow capacity of 8 g.p.m. is more efficient and quieter at slow speeds as compared to the top end of its speed range. Therefore, proper consideration to pump capacity and the speed at which the pump is driven are significant in achieving a system which is cost effective, efficient, and quiet. The embodiment of the subject invention shown in FIG. 3 achieves a unique blend by providing two different sized pumps of which the first pump is driven by a variable speed motor and therefore provides variable output, and the second pump is driven by a fixed speed motor and therefore delivers only a fixed amount of fluid flow. Both pumps 82 and 86 deliver fluid flow at a rate proportional to the speed of their respective electric motors 84,88.

Means 92 is provided to deliver a control signal at a preselected magnitude or value in response to the first implement control valve 56 being at a preselected location between the first and second positions 62,64 thereof. The control signal delivering means 92 includes a variable signal generator 94 which is connected to the first implement control valve 56 and controllably movable in response to movement of the valve 56. The variable signal generator 94 is adapted to deliver a control signal at a selected one of a plurality of magnitudes. Preferably, the variable signal generator 94 is a potentiometer having a controlling portion 96 which is connected to the shift lever 78 of the first implement control valve. The controlling portion 96 is movable in response to movement of the shift lever 78 which moves the control valve between the first 62, second 64, and third positions 76. A conductor 100 connects the controlling portion 96 to an analog-to-digital converter 98. The analog-to-digital converter 98 converts the analog signal having a steady voltage value to a digital signal having a pulse or cyclical voltage value, and directs the control signal by conductor 102 to a control signal receiving means 104. A source of electrical energy 106 is connected to a resistive element 108 of potentiometer which is contactable by the controlling portion 96 of the signal generator 94. Although we have described in particular the signal generator 94 as being a potentiometer, other transducers capable of delivering a control signal, for example, optical, and Hall Effect devices, are regarded as equivalent substitutions.

The control signal receiving means 104 is adapted to receive the delivered control signal and reduce the flow rate of fluid delivered by one of the first and second fluid flow generating systems 20,22 a preselected amount and increase the flow rate of fluid delivered by the other of the first and second fluid flow generating systems 20,22 an equal amount. The control signal receiving means 104 separately controls the flow rate of fluid deliverable from the first and second fluid flow generating systems 20,22 in response to the magnitude of the control signal received. The control signal receiving means 104 has a set point value which is representative of a preselected magnitude of the received control signal. The second fluid flow generating system 22 is controlled to deliver fluid only in response to the magnitude of the received control signal having a value greater than the set point and at a substantially constant preselected deliverable flow rate. The value of the set point is preferably located along curve 124 of FIG. 2 at point 129. It is to be noted that the set point is closely adjacent and just prior to vertical line 130 of the flow curve 124 (prior to a preselected location of the control valve 56) in the direction of travel of the implement valve (56) from the first position (62) towards the second position (64). The first flow generating system 20 is controlled to deliver fluid at a rate responsive to the magnitude of the received control signal and, during periods at which the received control signal has a value greater than the set point, reducing the fluid flow deliverability of the first flow generating system 20 and an amount substantially equal to the flow rate being delivered by the second flow generating system 22. In particular and with respect to continuous gradual movement of the control valve 56 from the first position 62 to the second position 64, the control signal receiving means 104 responds to the value of the control signal delivered from the variable signal generator 94, and increases the speed of the first motor 84 from a minimum speed towards a maximum speed in response to movement of the first implement control valve 56 from the first position towards a preselected location between the first and second positions, increases the speed of the second motor 88 and decreases the speed of the first motor 84 in response to the first implement control valve 56 being at the preselected location, and increases the speed of the first motor 84 in response to movement of the first implement control valve 56 from the preselected location towards the second position 64. The preselected location of the first control valve 56 is preferably a location at which the fluid flow demands of the first control valve 56 and primary work system 16 equals a preselected maximum output of the first fluid flow generating system 20.

The control signal receiving means 104 includes a signal processor 110 which is connected to the signal generator 94 via conductor 102 and is adapted to receive the control signal and deliver first and second processed signals. A processed signal receiving means 112 receives the processed signal and progressively increases the rate of fluid flow deliverable from the first fluid flow generating system 20 from a minimum flow rate to a maximum flow rate in response to progressive movement of the control valve 56 from the first position 62 to another location between the first position and the preselected location (set point), and progressively increases the rate of fluid flow deliverable from the first fluid flow generating system 20 from a flow rate less than the maximum to the maximum flow rate in response to progressive movement of the first control valve from a location between the preselected location and said second position to said second position 64.

The processed signal receiving means 112 includes a motor control 114 having a first motor control 116 for controlling the speed of the first motor and a second motor control 118 for controlling the speed of the second motor 88. A first conductor 120 connects the signal processor 110 to the first motor control 116, and a second conductor 122 connects the signal processor 110 to the second motor control 118. The first conductor 120 delivers the first processed signal to the first motor control 116, and the second conductor 122 delivers the second processed signal to the second motor control 118. The first processed signal is preferably a pulse having a range of magnitudes or values, i.e., frequency or pulse width, and the second signal is a fixed voltage which is either on or off. The processor 110 is programmed to compare the magnitude of the control signal delivered with a look-up table and deliver the first processed signal at a value indicated by the table, and deliver the second processed signal when indicated by the table. It is to be noted that the second processed signal is only delivered when the first implement control valve 56 is at or between the preselected location and the second position 64. The first motor control 116 is preferably a chopper control which is transistor operated and responsive to the value of the pulses of the first processed signal and the second motor control is transistor operated and turned either on or off, depending on whether or not the signal is absent or present. The first and second motor controls 116 and 118 will not be described in any further detail since construction thereof is easily discerned from a reading of the schematic of FIG. 2.

It can be readily seen that the control 14 heretofore described maximizes the efficiency of the fluid operated system through the proper matching of pump size and pump speed to the fluid flow requirements of the system 16 and 18, throughout their range of operation. Therefore, efficiency of the system is maximized by minimizing the usage of electrical energy as regulated by the control 14. Further, the controllability of the system 12 and the cost thereof also benefit from this unique control 14.

Industrial Applicability

Figure 3:
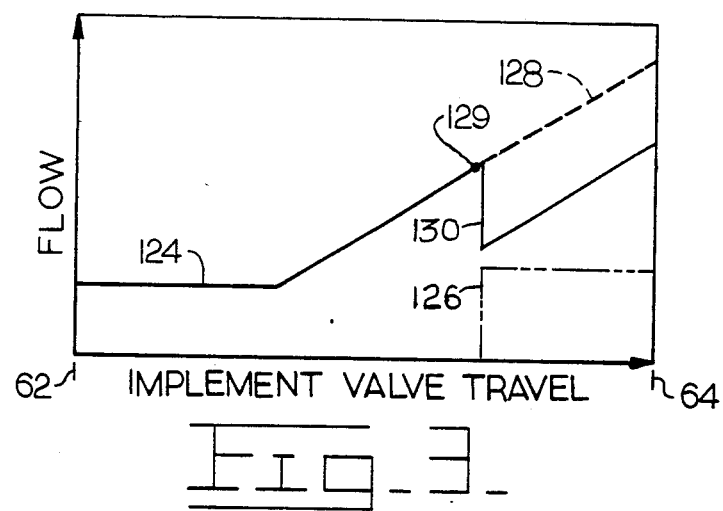
FIG. 3 is a graph having a vertical axis representing the flow of fluid deliverable by first and second fluid flow generating systems, and a horizontal axis representing the amount of travel of the control valve between first and second positions.

With reference to FIGS. 1, 2, and 3, the first fixed displacement pump 82 normally delivers pressurized fluid flow therefrom at a flow rate capable of satisfying the normal flow requirements of the primary work system 16. The second fixed displacement pump 86 is normally at rest without any fluid flow being delivered thereby. The fluid flow delivered by the first pump 82 is passed by conduit 40 to the flow control valve 28 which passes fluid flow from the first pump 82 to the steering valve 26 via conduit 36 and to the secondary work system 18 via conduit 34. It is to be noted that with no demand for steering flow, the flow control valve 28 is at a location between the first and second position 42 so that only enough fluid flow for control purposes is delivered to the steering valve 26. The remainder of fluid flow is delivered to the secondary work system 18. Upon actuation of the steering control valve 26, a drop in differential pressure will occur between pilot lines 48 and 50 which will result in the flow control valve 28 shifting toward position 42 to direct a greater portion of the fluid flow from pump 82 to the steering motor 24 and thereby satisfy the steering flow requirements. It should be noted that the primary work system 16 has priority over the secondary work system 18; however, only the amount of fluid required to satisfy the demands of the primary work system 16 will be supplied thereto. All additional fluid flow will be delivered to the secondary work system 18 via the flow control valve 28.

With reference to FIG. 3, the solid line 124 represents the fluid flow rate deliverable by the first pump 82 at various locations of the first implement control valve 56 between its first and second positions 62 and 64. The fluid flow rate deliverable by the second pump 86 is represented by phantom line 126, and the combined fluid flow of the first and second pumps 82 and 86 is represented by the dashed line 128. The location of the implement control valve 62 is represented by the horizontal axis of the graph with the first position 62 being located at the origin of the graph, and the second position 64 being represented at the far right along the horizontal axis of the graph. It should be noted that the preselected minimum amount of fluid flow deliverable by the first pump 82 is preferably adequate to satisfy the total fluid flow requirements of the steering system and also the preselected maximum fluid flow requirements of the second implement control valve 58. The minimum flow of the first pump 82 is represented by the horizontal portion of line 124 at the vertical axis.

Shifting of the first implement control valve 56 from the first position 62 towards the second position 64 causes an electrical signal of changing values, preferably linear, to be delivered from the variable signal generator 94 to the signal processor 110. The value of the control signal is preferably smallest at the first position 62 of the control valve 56 and largest at the second position 64. The processor 110 compares the value of the signal delivered with the look-up table and delivers an output signal to either the first motor control or both motor controls 116 and 118 as determined in accordance with the preprogrammed instructions. Because the output of the signal generator 94 is a function of the location of the first control valve 56 between the first and second positions 62 and 64, the amount of fluid flow to be delivered by the first and second pumps 82 and 86 can best be seen through inspection of the flow curves of FIG. 3. Please note that the preselected location between the first and second positions 62 and 64 of the first control valve 56 is located along the horizontal axis of the graph of FIG. 3 directly below vertical step 130 wherein the flow of the first pump 82 is reduced by the amount shown by the step portion of the graph and replaced with an equal amount of flow from the second pump 86 as represented by line 126. It is noted that the set point 129 of the control signal is located closely adjacent and prior to the step 130. The combined flow of the first and second pumps 82 and 86 is subsequently increased by increasing the flow rate of the first pump 82 from the reduced amount of fluid flow to subsequently higher levels as represented by dashed line 128. This increased flow is due to movement of the first implement control valve from the preselected location toward the second position 64.

Each of the first and second pumps 82 and 86 are tailored in size to maximize their efficiency. Preferably, the first pump 82 is larger in capacity than the second pump 86. Therefore, the minimum speed at which the first pump 82 is driven is kept at a range of speeds at which the efficiency of the pump is maximized. Similarly, the smaller pump 86 is run at a speed at which the efficiency and capacity are maximized. Because the fluid flow delivered from the second pump 86 is directed to the first and second implement valves 56 and 58 and in bypass of the primary work system 16, the ability to utilize a single speed electric motor 88 to drive the second fixed displacement pump 86 is realized.

Other aspects, objects, and advantages of this invention can be obtained from a study of the drawings, the disclosure, and the appended claims.

I claim:
1. A control for a work vehicle, comprising:
a fluid operated steering system having a fluid operated steering motor and a steering control valve connected to said steering motor;

a fluid operated implement system having a fluid operated implement motor and an implement control valve connected to said implement motor, said implement control valve having first and second positions and being movable between said positions;

a flow control valve connected to said steering control valve and said implement control valve;

a first pump having a preselected maximum flow delivering capacity and being connected to said flow control valve;

a first variable speed motor drivingly connected to said first pump, said flow control valve being adapted to deliver fluid flow from said first pump to said steering control valve and said implement control valve on a steering flow priority demand basis;

a second pump having a preselected maximum flow delivering capacity and being connected to said implement control valve, said maximum flow delivering capacity of the first pump being greater in magnitude than said maximum flow delivering capacity of the second pump;

a second single speed motor drivingly connected to said second pump, said second pump being adapted to deliver fluid flow to said implement control valve and in bypass of said steering system;

means for delivering a control signal having a magnitude representative of the relative position of the implement control valve between said first and second positions; and means for receiving said control signal and increasing the speed of the first motor from a minimum speed towards a maximum speed in response to movement of said implement control valve from said first position toward said second position, simultaneously actuating the second motor and decreasing the speed of the first motor in response to said implement control valve being at a preselected location between said first and second positions, and increasing the speed of said first motor in response to movement of said implement control valve from said preselected location toward said second position.

2. The control, as set forth in claim 1, wherein said control signal delivering means includes:
a variable signal generator connected to said control valve and being controllably movable in response to movement of said control valve.

3. The control, as set forth in claim 2, wherein the magnitude of the control signal varies throughout the full range of movement of the control valve, said magnitude being smallest at the first position of the control valve and largest at the second position of the control valve.

4. The control, as set forth in claim 2, wherein said variable signal generator includes a resistive element;
a source of electrical energy connected to said resistive element;
a controlling portion connected to said control valve; and
an analog to digital signal converter connected to said controlling portion and said control signal receiving means and being adapted to convert said delivered control signal from a constant voltage value to a pulse value.

5. The control, as set forth in claim 2, wherein said control signal receiving means includes:

a signal processor connected to said signal generator and said first and second motors, said signal processor being adapted to receive said control signal and deliver first and second processed signals; and
means for receiving said processed signals and controlling the rate of fluid flow deliverable from the first pump.

6. The control, as set forth in claim 5, wherein said processed signal receiving means includes:
a motor control connected to said first and second motors and said signal processor, said motor control being responsive to said first and second processed signals and adapted to vary the speed of said first motor and selectively actuate said second motor.

7. The control, as set forth in claim 1, wherein the rate of fluid flow deliverable by the first and second pumps is a function of the speed of the first and second motors, respectively, and said control signal delivering means includes a signal generator having a controlling portion connected to said implement control valve and movable in response to movement of said control valve to vary the value of the control signal being delivered, and wherein said control signal receiving means includes:

a signal processor connected to said signal generator and adapted to deliver first and second processed signals in response to receiving said control signal, said first and second processed signals each having a preselected range of values, and said signal processor being programmed to select the value of each of said processed signals as a function of the value of control signal received; and
a motor control connected to said signal processor and said first and second motors, said motor control being adapted to receive said first and second processed signals and increase the speed of the first motor in response to an increase in the value of said first processed signal, and actuate the second motor in response to receiving the second processed signal.

8. The control, as set forth in claim 7, wherein said flow control valve has an inlet port and first and second outlet ports, said flow control valve being movable between a first position at which said inlet port is connected to said first outlet port and a second position at which said inlet port is connected to said second outlet port, including;
a first conduit connecting said first pump to said inlet port and adapted to pass fluid flow from said first pump to said inlet port;
a second conduit connecting said first outlet port to said steering control valve;
a third conduit connecting said second outlet port to said implement control valve; and
a fourth conduit connecting said second pump to said third conduit and adapted to pass fluid from said second pump to said third conduit.

9. The control, as set forth in claim 8, including:
means for moving said flow control valve from said first position toward said second position in response to the rate of fluid flow delivered from the first pump to the steering motor being greater in magnitude than the amount of fluid flow required by the steering valve.

10. A work vehicle, comprising:
a vehicle frame;
a work implement mounted on said frame;

a steering system having a fluid operated steering motor and a steering control valve connected to said steering motor;

an implement system having a fluid operated implement motor and an implement control valve connected to said implement motor, said implement control valve having first and second positions and being movable between said positions;

a flow control valve connected to said steering control valve and said implement control valve;

a first pump connected to said flow control valve;

a first variable speed electric motor drivingly connected to said first pump, said first being adapted to deliver fluid flow at a rate proportional to the speed of the first electric motor, said first pump having a preselected maximum flow rate limit;

said flow control valve being adapted to pass fluid flow delivered from the first pump to said steering control valve and said implement control valve on a steering flow priority demand basis;

a second pump connected to said implement control valve;

a second single speed electric motor drivingly connected to said second pump, said second pump being adapted to deliver fluid flow to said implement control valve at a preselected flow rate, said preselected flow rate of the second pump being smaller in magnitude than the maximum flow rate of the first pump;

means for delivering a variable control signal having a value representative of each location of the implement control valve between said first and second positions; and means for receiving said control signal and simultaneously decreasing the speed of said first variable speed motor and actuating said second single speed motor in response to said control signal being at a preselected value.

11. The work vehicle, as set forth in claim 10, wherein said control signal receiving means includes:

a first motor control connected to said first variable speed motor and adapted to control the speed of said first variable speed motor;

a second motor control connected to said second single speed motor and adapted to control said second motor; and a signal processor connected to said control signal delivering means and said first and second motor controls, said signal processor being adapted to receive said control signal and deliver at least one of a first and second processed signal to said first and second motor controls, respectively, said first motor control being responsive to the first processed signal and adapted to change the speed of said first variable speed motor from a minimum speed to a maximum speed in response to said first processed signal being changed from one of a minimum and a maximum value to the other of said minimum and maximum values, and said second single speed motor being responsive to the second processed signal and actuatable in response to receiving said second processed signal.

* * * * *